(12) United States Patent
Niles

(10) Patent No.: US 9,102,556 B2
(45) Date of Patent: Aug. 11, 2015

(54) SPILL CONTROL MATERIAL AND METHOD OF USE

(76) Inventor: Lewis Scott Niles, Whitefiled, NH (US)

( * ) Notice: Subject to any disclaimer, the term of this patent is extended or adjusted under 35 U.S.C. 154(b) by 787 days.

(21) Appl. No.: 12/814,832

(22) Filed: Jun. 14, 2010

(65) Prior Publication Data
US 2010/0314321 A1    Dec. 16, 2010

Related U.S. Application Data

(60) Provisional application No. 61/186,914, filed on Jun. 15, 2009, provisional application No. 61/235,721, filed on Aug. 21, 2009.

(51) Int. Cl.
| | | |
|---|---|---|
| *C02F 1/42* | (2006.01) | |
| *C09K 3/32* | (2006.01) | |
| *E02B 15/04* | (2006.01) | |
| *B01J 20/28* | (2006.01) | |
| *B01J 20/16* | (2006.01) | |
| *C02F 1/68* | (2006.01) | |

(52) U.S. Cl.
CPC .............. *C02F 1/681* (2013.01); *B01J 20/16* (2013.01); *B01J 20/2803* (2013.01); *C09K 3/32* (2013.01); *E02B 15/041* (2013.01)

(58) Field of Classification Search
USPC .............. 210/925, 502.1, 503, 663, 680, 691, 210/747.1, 747.5; 423/328.1; 502/407
See application file for complete search history.

(56) References Cited

U.S. PATENT DOCUMENTS

| | | | |
|---|---|---|---|
| 3,414,511 A | | 12/1968 | Hitzman |
| 3,843,306 A | | 10/1974 | Whittington et al. |
| 4,142,969 A | * | 3/1979 | Funk et al. .................... 210/680 |
| 4,395,357 A | * | 7/1983 | Kramer et al. ............... 502/401 |
| 4,840,734 A | | 6/1989 | Johnson |
| 4,853,004 A | * | 8/1989 | Kaplan et al. ..................... 95/96 |
| 4,913,835 A | * | 4/1990 | Mandel et al. ............... 252/190 |
| 5,035,804 A | | 7/1991 | Stowe |
| 2005/0199558 A1 | * | 9/2005 | Jensen ......................... 210/767 |
| 2007/0267350 A1 | | 11/2007 | Camp et al. |

FOREIGN PATENT DOCUMENTS

| | | |
|---|---|---|
| DE | 202006020016 U1 | 7/2007 |
| EP | 0087001 A1 | 8/1983 |

OTHER PUBLICATIONS

Leonard, Joseph W., ed., Coal Preparation (5th Ed.), Society for Mining, Metallurgy, and Exploration (SME), 1991, p. xxi.*
European Patent Office, European Search Report in EP Patent Application No. 10810339.5 (Apr. 8, 2014).
Database WPI, Week 200048, XP-002720779 at abstract (Thomson Scientific, London Dec. 27, 1999).
Database WPI, Week 200746, XP-002720780 at abstract (Thomson Scientific, London Mar. 27, 2007).

* cited by examiner

*Primary Examiner* — Chester Barry
(74) *Attorney, Agent, or Firm* — Mesmer & Deleault PLLC

(57) ABSTRACT

A spill control material has a combination of a pre-defined blended granule size mixture of amorphous alumina silicate in an aggregate blend of a plurality of predefined sieve grades where the combination has enhanced encapsulation properties greater than a single granule formulation. The pre-defined blended granule size mixture of amorphous alumina silicate has granules ranging in sizes larger than five microns and less than sixty-six microns in an aggregate blend of sieve grades #3 and #0.

13 Claims, No Drawings

SPILL CONTROL MATERIAL AND METHOD OF USE

This application claims the benefit of U.S. Provisional Patent Application No. 61/186,914, filed Jun. 15, 2009 and U.S. Provisional Patent Application No. 61/235,721, filed Aug. 21, 2009.

BACKGROUND OF THE INVENTION

1. Field of the Invention

The present invention relates generally to compositions of matter for mitigating hazardous waste spills.

2. Description of the Prior Art

The building trades, disaster relief, and environmental protection industries have used a material for spill control for decades. The material of choice for spill control is commonly known as pumice, or amorphous alumina silicate. Pumice is a form of volcanic glass. This mineral is formed as a result of violent volcanic eruptions where gasses are forced to mix with the molten magma in the volcanic chamber prior to eruption. The magma-gas mixture then expands millions of times as the molten material blasts from the volcano. This explosive action releases the trapped gaseous molecules and instantly creates billions of micro-porous cavities in the crystals of the pumice as it rapidly cools. As a class of minerals, amorphous alumina silicate is called zeolite. Zeolite is then further classified as molecular sieves. This unique characteristic allows the mineral to divide and sort molecules according to size. Thus, the tiny molecules of noble gasses such as hydrogen and oxygen are released harmlessly to the atmosphere while larger molecules such as carbons are trapped in the molecular pores of the mineral. Further, an ionic process bonds the carbon molecules to the inside of the porous minerals forever.

This sorting and subsequent ionic bonding allows amorphous alumina silicate to very effectively and instantly encapsulate hydrocarbons such as petro-carbons including, but not limited to, oils, fuels, glycols, thinners, inks, paints, solvents, greases and acids such as sulfuric and hydrochloric acid. It is very effective in encapsulating chlorines and other chemical molecules as well.

Often, however, existing spill control materials do not perform in the field as promised on their packaging for reasons that are unknown. The result is that much more material must be used, which is costly and inefficient. Because not all of the liquid is bound up in the material, the spill material and control material must be handled as bulky hazardous waste, which makes it even more expensive to use.

Therefore, what is needed is a spill control material that tightly binds spilled material to itself so that the spill control material and bound hazardous material can be disposed of as non-hazardous waste, and can be reused, thereby saving a great deal of expense.

SUMMARY OF THE INVENTION

The invention is a composition of matter that satisfies the need for a spill control material that tightly binds spilled material so that it can be disposed of as non-hazardous waste, and can be reused, thereby saving a great deal of expense. U.S. Ser. No. 61/186,914 filed Jun. 15, 2009 and U.S. Ser. No. 61/235,721 filed Aug. 21, 2009 are incorporated herein by reference.

The present invention achieves these and other objectives by providing a combination of a pre-defined blended granule size mixture of amorphous alumina silicate in an aggregate blend of a plurality of predefined sieve grades where the combination has enhanced encapsulation properties greater than a single granule formulation.

In one embodiment of the present invention, the combination of the pre-defined blended granule size mixture of amorphous alumina silicate has granules ranging in sizes larger than five microns and less than sixty-six microns in an aggregate blend of sieve grades #3 and #0.

In another embodiment, the aggregate blend of sieve grades #3 and #0 are in a ratio of about one to one by weight.

In a further embodiment of the present invention, the combination optionally includes a predefined quantity by weight of hydrolyzed lime and a predefined quantity by weight of borax.

In still another embodiment, the predefined quantity of hydrolyzed lime is about two percent by weight and the predefined quantity of borax is about two percent by weight.

In yet another embodiment, the present invention includes equal parts by weight of the combination of the pre-defined blended granule size mixture of amorphous alumina silicate having granules ranging in sizes larger than five microns and less than sixty-six microns in an aggregate blend of sieve grades #3 and #0 and a second mixture of amorphous alumina silicate that includes sieve grade #8, sieve grade #6 and sieve grade #4.

In another embodiment, wherein the second mixture has equal parts by weight of sieve grade #8, sieve grade #6 and sieve grade #4.

In a further embodiment of the present invention, wherein the plurality of predefined sieve grades is an aggregate blend of sieve mesh 20, sieve mesh 30, sieve mesh 60, sieve mesh 140, sieve mesh 200, and sieve mesh 325.

In another embodiment of the present invention, there is disclosed a method of controlling a water-borne spill. The method includes broadcasting a mixture of amorphous alumina silicate granules of sieve grade #8, sieve grade #6 and sieve grade #4 onto the surface of the water-borne spill forming a floating mat on the spill, skimming the floating mat and the spill from the surface of the water, and mixing the skimmed mat and spill with a spill control material that is a combination of amorphous alumina silicate granules ranging in sizes larger than five microns and less than sixty-six microns, in an aggregate blend of sieve grades #3 and #0.

In still another embodiment, the method includes mixing one part by weight of the spill control material with one part of the broadcasting blend.

In a further embodiment, the method includes forming the broadcasting blend by mixing equal parts by weight of the sieve grades #8, #6 and #4.

In another embodiment, the method includes forming the aggregate blend of sieve grades #3 and #0 in a ratio of one to one by weight.

In still another embodiment of the present invention, there is disclosed a method of protecting beach lines and/or shorelines from water-borne contaminants. The method includes providing a spill control material that is composed of one part by weight of a combination of a pre-defined blended granule size mixture of amorphous alumina silicate in an aggregate blend of a plurality of predefined sieve grades wherein the combination has enhanced encapsulation properties greater than a single granule formulation and one part by weight of a second mixture of amorphous alumina silicate that includes sieve grade #8, sieve grade #6 and sieve grade #4. The spill control material is then broadcast onto the beach lines and/or shorelines.

These and other features, aspects, and advantages of the present invention will become better understood with regard to the following description and claims.

DETAILED DESCRIPTION OF THE PREFERRED EMBODIMENT

It is an object of the present invention to provide a spill control material that binds a spilled material so that the encapsulated material can be disposed as a non-hazardous material. It is another object of the present invention to provide a spill control material that is reusable depending on the viscosity of the spilled material.

The present invention achieves these and other objectives by providing a spill control material containing amorphous alumina silicate having a blended granule size dispersion mixture capable of enhancing encapsulation of a spilled material. The present invention is a paradigm shift product because a way has been found to enhance the encapsulation capability of the mineral through granule size dispersion to become thousands of times more effective than the single grind versions available on the market previously for spill control. This is a surprising an unexpected result.

The blend of the present invention creates billions more opportunities for the granule surfaces to make contact and generate the ionic reaction that takes place when a spilled material molecule such as, for example, carbon is introduced between two mineral molecules. The resulting rapid encapsulation of hydrocarbons and other liquids makes the present invention far superior to any other absorbents previously available. Because the trapped carbon molecules, which are no longer liquid, can never be released from the ionic bond inside the mineral's micro-porous structure, the used material can then be directly disposed in a landfill with no further hazardous waste mitigation. This eliminates a myriad of problems like further environmental contamination, which is common to other types of clean up materials, and the prodigious costs associated with further mitigation of oil soaked materials.

Uses:

Several effective blends of minerals, i.e. embodiments, have been developed which successfully provide the same rapid encapsulation capabilities. It is important to note that, depending on the viscosity of the material being absorbed, products embodying the present invention can be re-used up to six times before being directly disposed into the non hazardous waste stream. This is a tremendous value-added characteristic unique to the present invention.

EXAMPLE 1

In this example, the spill control material is a combination of amorphous alumina silicate granules ranging in sizes larger than five microns and less than sixty-six microns, in an aggregate blend of sieve grades #3 granules and #0 granules in a ratio of one to one by weight.

The spill control material of the present invention is a granule-based product that provides instant molecular encapsulation for all types of hydrocarbon spills. It is ideal for industrial uses and works effectively on all large and small spills such as machine oils and lubricants, coolants (including glycol and non-glycol types), acids, fuels like oil, diesel, gasoline, kerosene, racing and aviation fuels, thinners, lacquers, solvents, inks, latex and oil based paints, and the like. It can be applied before a spill occurs or applied to an existing spill with equally satisfactory results. Only minor agitation is required for maximum effectiveness. A stiff broom or squeegee may optionally be used to provide the agitation. Clean-up is simple with conventional broom and dustpan or vacuum methods. The spill control material does not leave any oil residue on the affected surface and, in most cases, the treated surface is actually cleaner than before the spill occurred.

An unexpected but very significant quality of the present invention is its ability to control the flash point of fuel spills. The flash point occurs when a fuel spill releases vapors which can ignite explosively. When broadcast on a liquid fuel spill, the material of the present invention instantly begins to encapsulate the liquid that is releasing the vapors. This action effectively slows down the vaporization and substantially reduces the risk of explosion to minimal levels. Consequently, its use is ideal at accident scenes where fuels are often spilled. The spilled fuel causes dangerous vapors to threaten the lives of victims and response teams like firemen, police and emergency medical technicians.

The spill control material may optionally be further modified in granulation or mineral composition and used effectively for many other uses. The following examples are some of these modified compositions:

EXAMPLE 2

In this example, the spill control material of Example 1 is blended with a two percent (2%) inclusion of hydrolyzed lime and a two percent (2%) inclusion of borax by weight. This formulation is designed to mitigate bio-hazard spills such as blood, urine, vomit and other bodily fluids. It is extremely effective in clean up of septage spills and other septic applications. The formulation brings the pH level of the bio-hazard spill to within acceptable standards while breaking down and encapsulating the solids for direct disposal into any landfill or for spreading on approved septage spread sites. Its uses include hospital and mortuary applications, accident scenes, flooded water treatment centers, septic overflows, municipal waste water and pipeline projects. It is also useful for all types of household spills including milk, cooking oils and grease, soaps and cleaning agents, ammonia and bleach. This formulation of the present invention is far superior to other conventional means of spill control and mitigation anywhere a bio-hazard spill occurs.

EXAMPLE 3

The spill control material in this example is a blend of a heavier mix of amorphous alumina silicate that includes one part by weight of sieve grade #8, sieve grade #6 and sieve grade #4 mixed with one part by weight of the spill control material of Example 1. This formulation can be broadcast onto beach lines and shorelines when a floating spill threatens the environment. When used in an amount sufficient to match the size of the threat, this formulation will encapsulate most of the waterborne contaminants before they can cause major or irreparable harm to coastal shorelines and beaches. The used material can then be easily collected and disposed directly into a landfill with no further treatment or mitigation. The use of this formulation has the potential for saving untold millions of dollars in clean-up efforts and associated costs, and will leave the environment substantially intact.

EXAMPLE 4

This example is similar to the composition of Example 3 except that this embodiment involves a two part process for use on water-borne spills. The first part of the process involves broadcasting a blend and/or mixture of amorphous alumina silicate granules mixed in equal parts by weight of sieve grade #8, sieve grade #6 and sieve grade #4 onto the surface of the water-borne spill. This first part floats on the surface of the water or water-borne spill. Its function is to control and stop the spread of the slick and to begin the encapsulation process immediately. The floating mat of granules forms a scab over the spill thus helping to limit the spread of the slick. The material, along with the slick, is then skimmed from the surface of the water. As the used material is collected, it is mixed with the spill control material of Example 1 which then completely encapsulates and mitigates any remaining oils or residues.

In certain applications, an appropriate amount of hydrocarbon-eating microbes can optionally be added to the mixture to consume any film or "oil rainbow" left on the surface of the water. There are naturally occurring microbes in all water sources that, combined with wind and wave action, can do this over time. By adding microbes to the mix, however, the process is sped up considerably. After consuming the film, the majority of the microbes will die off leaving the environment in its natural state. Any remaining microbes will simply assimilate into the existing population without affecting the local eco-system.

Other applications such as the safe cleaning of shore and wading birds and sea life only add to the attractiveness of these environmentally responsible products. Other uses will become apparent as new circumstances present different challenges. Millions of gallons of oil are pumped and spilled every day and have become one of our most serious environmental challenges. As mindsets and governments move toward greener technologies, products embodying the present invention can safely, effectively and economically solve many of these problems.

EXAMPLE 5

In this example, another formulation/blend/mix has been found to pull/remove oil stains from laundry. Its formulation is a combination of amorphous alumina silicate granules ranging in sizes equal to those in Example 1 in an aggregate blend of sieve mesh #20 to #325. Formulation of one such embodiment is described in Table 1 below.

TABLE 1

| U.S. Mesh Sieve | Accumulated Weight | Accumulated Percent Retained | Percent Passing |
| --- | --- | --- | --- |
| 20 | Lt | — | 100 |
| 30 | .04 | .06 | 99.9 |
| 60 | 13.7 | 21.6 | 78.4 |
| 140 | 40.2 | 63.3 | 36.7 |
| 200 | 50.9 | 80.2 | 19.8 |
| 325 | 58.9 | 92.8 | 7.2 |
| Pan | 635 | 100 | |

Although the preferred embodiments of the present invention have been described herein, the above description is merely illustrative. Further modification of the invention herein disclosed will occur to those skilled in the respective arts and all such modifications are deemed to be within the scope of the invention as defined by the appended claim.

What is claimed is:

1. A spill control material comprising:
a mixture of amorphous alumina silicate granules having a plurality of predefined sieve grades, wherein the mixture has enhanced molecular encapsulation compared to alumina silicate granules of a single sieve grade, wherein the mixture of amorphous alumina silicate granules further comprises granules ranging in sizes larger than five microns and less than sixty-six microns and wherein the plurality of predefined sieve grades comprises sieve grade #3 granules and sieve grade #0 granules.

2. The spill control material of claim 1 wherein the sieve grade #3 granules and sieve grade #0 granules are mixed in substantially equal parts by weight.

3. The spill control material of claim 1, further comprising a predefined quantity by weight of hydrolyzed lime and a predefined quantity by weight of borax.

4. The spill control material of claim 3 wherein the predefined quantity of hydrolyzed lime is equal to about two percent by weight.

5. The spill control material of claim 3 wherein the predefined quantity of borax is equal to about two percent by weight.

6. The spill control material of claim 1, further comprising an equal part by weight of a second mixture of amorphous alumina silicate granules, wherein the second mixture includes sieve grade #8 granules, sieve grade #6 granules, and sieve grade #4 granules.

7. The spill control material of claim 6 wherein the second mixture has equal parts by weight of sieve grade #8 granules, sieve grade #6 granules, and sieve grade #4 granules.

8. A spill control material comprising:
a mixture of amorphous alumina silicate granules having a plurality of predefined sieve grades, wherein the mixture has enhanced molecular encapsulation compared to alumina silicate granules of a single sieve grade, wherein the plurality of predefined sieve grades is an aggregate blend of sieve mesh 20, sieve mesh 30, sieve mesh 60, sieve mesh 140, sieve mesh 200, and sieve mesh 325.

9. A method of controlling a water-borne spill, the method comprising:
providing a mixture of amorphous alumina silicate granules having a plurality of predefined sieve grades comprising sieve grade #8, sieve grade #6, and sieve grade #4, wherein the mixture has enhanced molecular encapsulation compared to alumina silicate granules of a single sieve grade;
broadcasting the mixture of amorphous alumina silicate granules onto the surface of the water-borne spill forming a floating mat on the spill;
skimming the floating mat and the spill from the surface of the water; and
mixing the skimmed mat and spill with a spill control material that is a combination of amorphous alumina silicate granules ranging in sizes larger than five microns and less than sixty-six microns, sieve grade #3 granules, and sieve grade #0 granules.

10. The method of claim 9 wherein the mixing step includes mixing one part by weight of the spill control material with one part of the mixture.

11. The method of claim 9 further comprising forming the mixture by mixing equal parts by weight of sieve grade #8 granules, sieve grade #6 granules, and sieve grade #4 granules.

12. The method of claim 9, wherein the mixing step further includes mixing the sieve grade #3 granules and the sieve grade #0 granules in a ratio of one to one by weight.

13. The method of claim 9, wherein the broadcasting step includes broadcasting the spill control material onto the beach lines and/or shorelines.

* * * * *